United States Patent
Yerramalli et al.

(10) Patent No.: US 11,632,740 B2
(45) Date of Patent: Apr. 18, 2023

(54) MULTICAST OR BROADCAST ETHERNET TRAFFIC TRANSMISSIONS OVER A RADIO ACCESS NETWORK

(71) Applicant: QUALCOMM Incorporated, San Diego, CA (US)

(72) Inventors: Srinivas Yerramalli, San Diego, CA (US); Rajat Prakash, San Diego, CA (US); Xiaoxia Zhang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/591,215

(22) Filed: Oct. 2, 2019

(65) Prior Publication Data

US 2020/0112941 A1 Apr. 9, 2020

Related U.S. Application Data

(60) Provisional application No. 62/741,197, filed on Oct. 4, 2018.

(51) Int. Cl.
*H04W 72/00* (2009.01)
*H04W 72/12* (2009.01)
(Continued)

(52) U.S. Cl.
CPC ......... *H04W 72/005* (2013.01); *H04W 28/04* (2013.01); *H04W 72/121* (2013.01);
(Continued)

(58) Field of Classification Search
CPC ............. H04W 72/005; H04W 72/121; H04W 72/1273; H04W 28/04; H04W 72/1289
See application file for complete search history.

(56) References Cited

U.S. PATENT DOCUMENTS

2011/0096796 A1* 4/2011 Zhang ................... H04L 5/0053
370/474
2011/0149760 A1* 6/2011 Shrivastava ............ H04L 5/006
370/252

(Continued)

FOREIGN PATENT DOCUMENTS

| CN | 102158307 A | 8/2011 |
| CN | 105409287 A | 3/2016 |
| WO | 2018128376 A1 | 7/2018 |

OTHER PUBLICATIONS

International Search Report and Written Opinion—PCT/US2019/054463—ISA/EPO—dated Nov. 25, 2019.

*Primary Examiner* — Peter Chen

(74) *Attorney, Agent, or Firm* — Harrity & Harrity, LLP

(57) ABSTRACT

Various aspects of the present disclosure generally relate to wireless communication. In some aspects, a user equipment (UE) may receive a configuration for a group of UEs, including the UE, associated with a common set of parameters indicated in multicast or broadcast traffic, wherein the configuration includes a group identifier associated with the group of UEs; and receive the multicast or broadcast traffic over a radio access network (RAN) in a physical downlink shared channel (PDSCH) communication, wherein the group identifier is used to identify that the multicast or broadcast traffic is intended for the UE. Numerous other aspects are provided.

30 Claims, 7 Drawing Sheets

(51) Int. Cl.
  *H04W 28/04* (2009.01)
  *H04W 80/02* (2009.01)
  *H04W 72/121* (2023.01)
  *H04W 72/1273* (2023.01)

(52) U.S. Cl.
  CPC ... *H04W 72/1273* (2013.01); *H04W 72/1289* (2013.01); *H04W 80/02* (2013.01)

(56) References Cited

U.S. PATENT DOCUMENTS

| | | | | |
|---|---|---|---|---|
| 2014/0003319 | A1* | 1/2014 | Etemad | H04W 48/12 |
| | | | | 370/312 |
| 2014/0303784 | A1* | 10/2014 | Obrist | H04L 12/4641 |
| | | | | 700/275 |
| 2016/0174194 | A1* | 6/2016 | Suzuki | H04L 5/0091 |
| | | | | 370/312 |
| 2016/0309354 | A1* | 10/2016 | Yerramalli | H04W 76/27 |
| 2017/0201964 | A1* | 7/2017 | Gupta | H04W 4/06 |
| 2017/0325277 | A1* | 11/2017 | Fujishiro | H04W 4/06 |
| 2019/0109711 | A1* | 4/2019 | Gladwin | H04L 9/085 |

\* cited by examiner

MULTICAST OR BROADCAST ETHERNET TRAFFIC TRANSMISSIONS OVER A RADIO ACCESS NETWORK

RELATED APPLICATION

This application claims priority to U.S. Provisional Patent Application No. 62/741,197, filed on Oct. 4, 2018, entitled "MULTICAST OR BROADCAST ETHERNET TRAFFIC TRANSMISSIONS OVER A RADIO ACCESS NETWORK," which is hereby expressly incorporated by reference herein.

FIELD OF THE DISCLOSURE

Aspects of the present disclosure generally relate to wireless communication and to techniques and apparatuses for multicast or broadcast Ethernet traffic transmissions over a radio access network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other technologies. These improvements may be applicable to other multiple access technologies and the telecommunication standards that employ these technologies.

SUMMARY

In some aspects, a method of wireless communication, performed by a base station, may include identifying a group of user equipment (UEs) to receive multicast or broadcast traffic over a radio access network (RAN), wherein the group of UEs is associated with a common set of parameters indicated in the multicast or broadcast traffic; transmitting a configuration to the group of UEs, wherein the configuration includes a group identifier associated with the group of UEs; and transmitting the multicast or broadcast traffic over the RAN in a physical downlink shared channel (PDSCH) communication, wherein the group identifier is used to indicate the multicast or broadcast traffic to the group of UEs.

In some aspects, a base station for wireless communication may include memory and one or more processors operatively coupled to the memory. The memory and the one or more processors may be configured to identify a group of user equipment (UEs) to receive multicast or broadcast traffic over a radio access network (RAN), wherein the group of UEs is associated with a common set of parameters indicated in the multicast or broadcast traffic; transmit a configuration to the group of UEs, wherein the configuration includes a group identifier associated with the group of UEs; and transmit the multicast or broadcast traffic over the RAN in a physical downlink shared channel (PDSCH) communication, wherein the group identifier is used to indicate the multicast or broadcast traffic to the group of UEs.

In some aspects, a non-transitory computer-readable medium may store one or more instructions for wireless communication. The one or more instructions, when executed by one or more processors of a base station, may cause the one or more processors to identify a group of user equipment (UEs) to receive multicast or broadcast traffic over a radio access network (RAN), wherein the group of UEs is associated with a common set of parameters indicated in the multicast or broadcast traffic; transmit a configuration to the group of UEs, wherein the configuration includes a group identifier associated with the group of UEs; and transmit the multicast or broadcast traffic over the RAN in a physical downlink shared channel (PDSCH) communication, wherein the group identifier is used to indicate the multicast or broadcast traffic to the group of UEs.

In some aspects, an apparatus for wireless communication may include means for identifying a group of user equipment (UEs) to receive multicast or broadcast traffic over a radio access network (RAN), wherein the group of UEs is associated with a common set of parameters indicated in the multicast or broadcast traffic; means for transmitting a configuration to the group of UEs, wherein the configuration includes a group identifier associated with the group of UEs; and means for transmitting the multicast or broadcast traffic over the RAN in a physical downlink shared channel (PDSCH) communication, wherein the group identifier is used to indicate the multicast or broadcast traffic to the group of UEs.

In some aspects, a method of wireless communication, performed by a user equipment (UE), may include receiving a configuration for a group of UEs, including the UE, associated with a common set of parameters indicated in multicast or broadcast traffic, wherein the configuration includes a group identifier associated with the group of UEs; and receiving the multicast or broadcast traffic over a radio access network (RAN) in a physical downlink shared channel (PDSCH) communication, wherein the group identifier is used to identify that the multicast or broadcast traffic is intended for the UE.

In some aspects, a UE for wireless communication may include memory and one or more processors operatively coupled to the memory. The memory and the one or more processors may be configured to receive a configuration for a group of UEs, including the UE, associated with a common set of parameters indicated in multicast or broadcast traffic, wherein the configuration includes a group identifier associated with the group of UEs; and receive the multicast or broadcast traffic over a radio access network (RAN) in a physical downlink shared channel (PDSCH) communication, wherein the group identifier is used to identify that the multicast or broadcast traffic is intended for the UE.

In some aspects, a non-transitory computer-readable medium may store one or more instructions for wireless communication. The one or more instructions, when executed by one or more processors of a UE, may cause the one or more processors to receive a configuration for a group of UEs, including the UE, associated with a common set of parameters indicated in multicast or broadcast traffic, wherein the configuration includes a group identifier associated with the group of UEs; and receive the multicast or broadcast traffic over a radio access network (RAN) in a physical downlink shared channel (PDSCH) communication, wherein the group identifier is used to identify that the multicast or broadcast traffic is intended for the UE.

In some aspects, an apparatus for wireless communication may include means for receiving a configuration for a group of UEs, including the apparatus, associated with a common set of parameters indicated in multicast or broadcast traffic, wherein the configuration includes a group identifier associated with the group of UEs; and means for receiving the multicast or broadcast traffic over a radio access network (RAN) in a physical downlink shared channel (PDSCH) communication, wherein the group identifier is used to identify that the multicast or broadcast traffic is intended for the apparatus.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
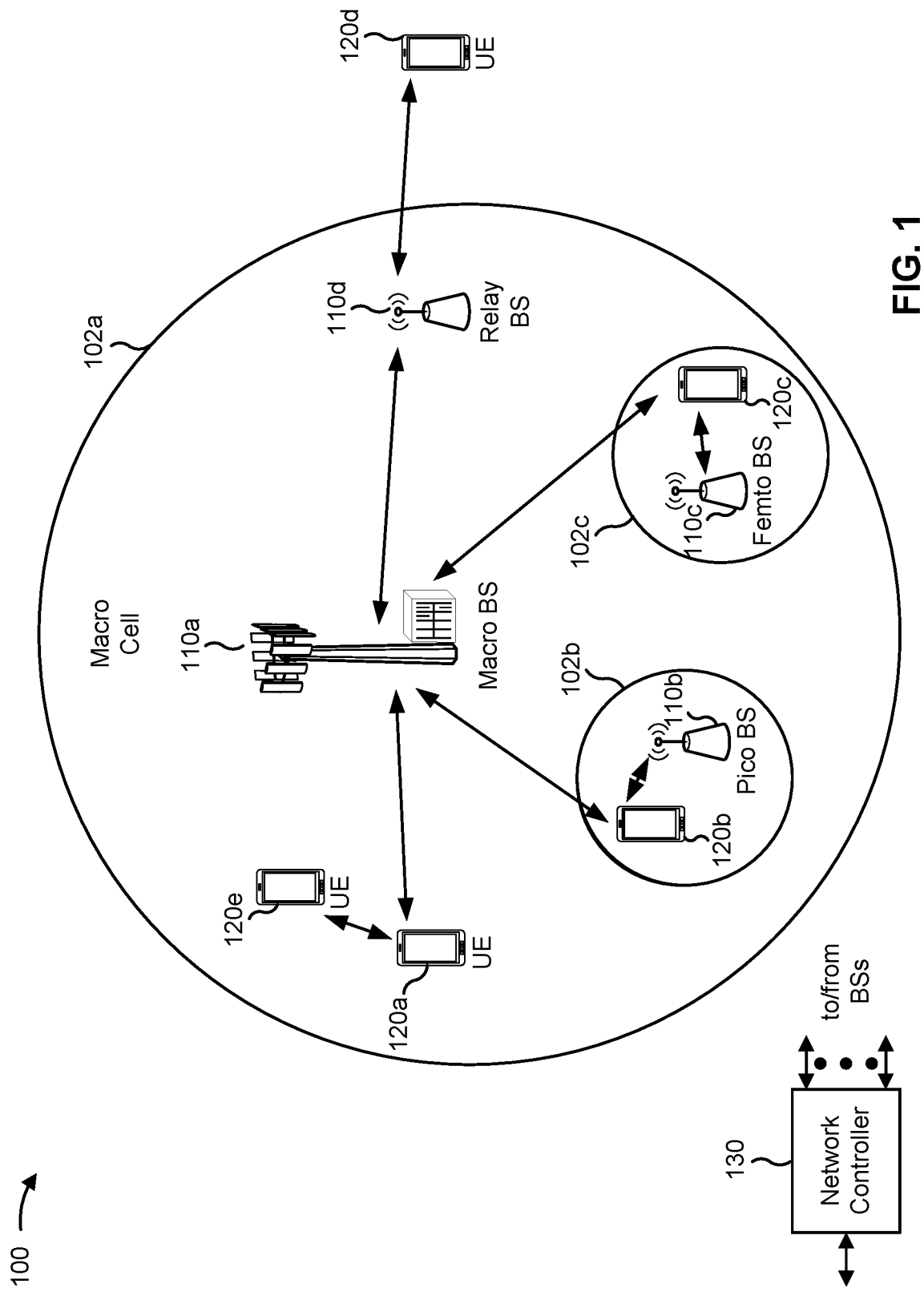
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Some techniques and apparatuses described herein permit multicast or broadcast Ethernet traffic or similar types of network traffic to be transmitted, using multicast or broadcast operations, over a wireless wide area network (WWAN), such as by using New Radio and/or another types of radio access technology (RAT). In some aspects, this may be accomplished by configuring, by a base station 110, a group of UEs 120 to receive multicast or broadcast traffic over a radio access network (e.g., using a physical downlink shared channel (PDSCH)). The configuration may include a group identifier for the group of UEs 120, and the group identifier may be used when transmitting the multicast or broadcast traffic, when receiving the multicast or broadcast traffic, when decoding the multicast or broadcast traffic, and/or the like. Additional details are provided elsewhere herein.

As indicated above, FIG. 1 is provided merely as an example. Other examples are possible and may differ from what was described with regard to FIG. 1.

Figure 2:
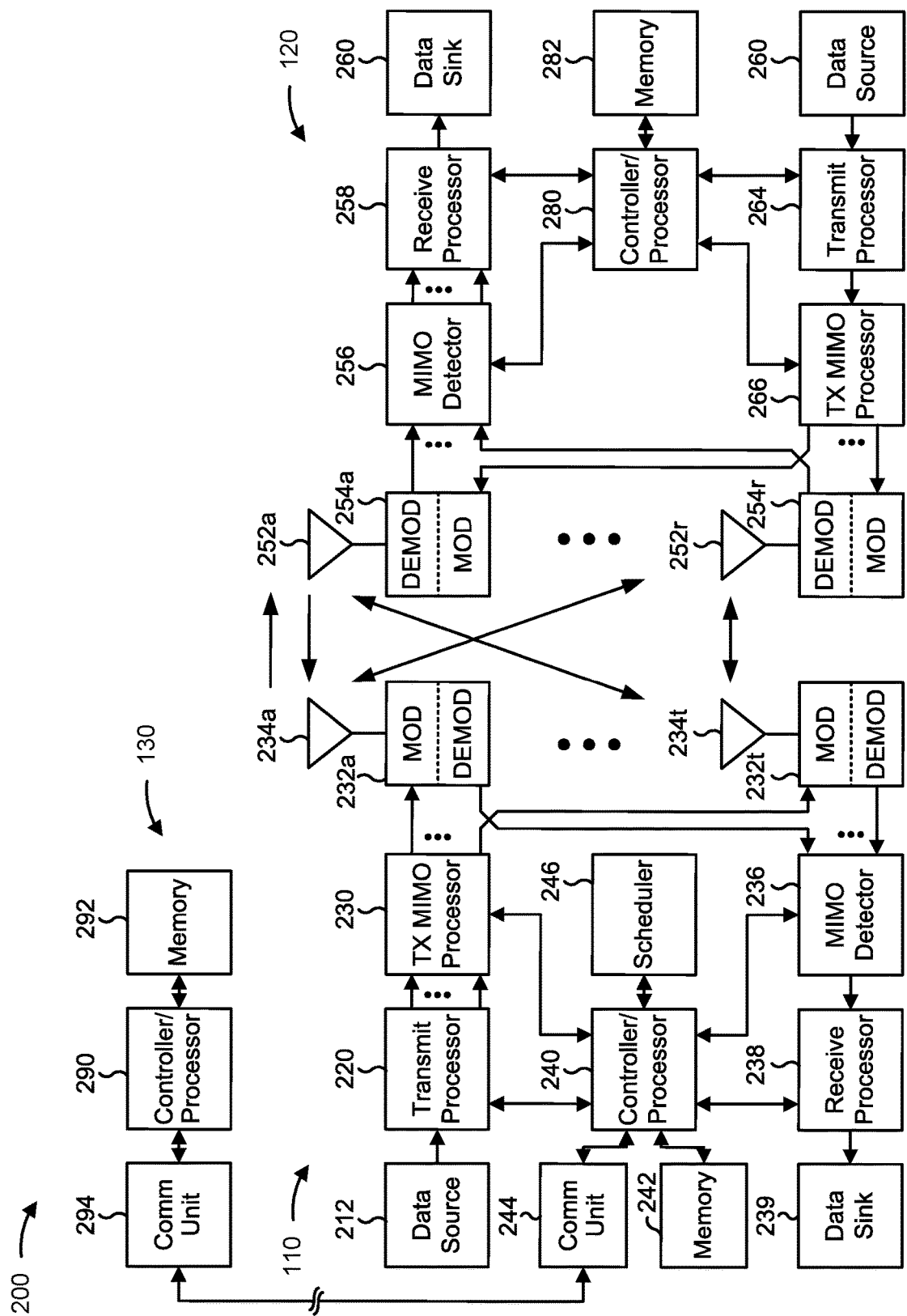
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with multicast or broadcast Ethernet traffic transmissions over a radio access network, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a configuration for a group of UEs, including the UE 120, associated with a common set of parameters indicated in multicast or broadcast traffic, wherein the configuration includes a group identifier associated with the group of UEs; means for receiving the multicast or broadcast traffic over a radio access network (RAN) in a physical downlink shared channel (PDSCH) communication, wherein the group identifier is used to identify that the multicast or broadcast traffic is intended for the UE 120; and/or the like. In some aspects, such means may include one or more components of UE 120 described in connection with FIG. 2.

In some aspects, base station 110 may include means for identifying a group of user equipment (UEs) to receive multicast or broadcast traffic over a radio access network (RAN), wherein the group of UEs is associated with a common set of parameters indicated in the multicast or broadcast traffic; means for transmitting a configuration to the group of UEs, wherein the configuration includes a group identifier associated with the group of UEs; means for transmitting the multicast or broadcast traffic over the RAN in a physical downlink shared channel (PDSCH) communication, wherein the group identifier is used to indicate the multicast or broadcast traffic to the group of UEs; and/or the like. In some aspects, such means may include one or more components of base station 110 described in connection with FIG. 2.

As indicated above, FIG. 2 is provided merely as an example. Other examples are possible and may differ from what was described with regard to FIG. 2.

In New Radio and other types of radio access technologies (RATs), Ethernet traffic, local area network (LAN) traffic, and/or other non-Internet Protocol (IP) traffic may be transported over a wireless wide area network (WWAN), such as a cellular network, a 5G network, and/or the like. For example, a packet data network (PDN) and corresponding protocols have been defined for transporting Ethernet traffic over 5G, sometimes referred to as Ethernet over packet data convergence protocol (PDCP).

Ethernet and/or other protocols traditionally used for wired communications may be capable of handling a multicast and/or broadcast communication, such as by transmitting that communication to all destination points in a network (e.g., a LAN, a virtual LAN (VLAN), and/or the like) indicated in the communication (e.g., a LAN and/or VLAN tag included in an Ethernet frame). This is sometimes referred to as flooding. In some cases, one or more bits of a packet (e.g., an Ethernet frame and/or the like) may indicate whether the packet is a multicast packet, a broadcast packet, and/or the like, and may be handled accordingly. However, when multicast or broadcast Ethernet traffic (or similar traffic) is transmitted over a WWAN, a base station 110 may not be configured to transmit the traffic to the appropriate destinations. For example, whereas traffic can be flooded to local network destinations on a wired network, such flooding is difficult to apply to a wireless network. There are also additional issues regarding reliable transmission of such multicast or broadcast communications over a WWAN, handling security and encryption of such communications, acknowledging receipt of such communications, and/or the like. Some techniques and apparatuses described herein permit Ethernet multicast and/or broadcast behavior to be mapped to wireless transmissions, thereby addressing these and other issues relating to wireless transmission of communications using traditionally wired protocols or other protocols where multicast or broadcast information is carried at the media access control (MAC) layer (or non-IP layer).

New Radio and similar types of RATs may use evolved multimedia broadcast multicast services (eMBMS) or single-cell point-to-multipoint (SC-PTM) services to transmit multicast or broadcast traffic to UEs 120. However, both of these services typically require advanced setup using core network devices (e.g., not at the base station 110), such as for multi-cell coordination, which does not permit dynamic configuration, dynamic traffic handling, dynamic traffic adaptation, and/or the like. Furthermore, these services are designed to support unidirectional traffic from the core network and/or base station 110 to the UEs 120. However, Ethernet multicast and/or broadcast traffic (or similar traffic) may flow from a UE 120 to a base station 110, and then from the base station 110 to a group of UEs 120. Some techniques and apparatuses described herein permit such traffic flow and control by a base station 110 and UE 120.

In SC-PTM, a system information block (e.g., SIB20) contains information for the UE 120 to receive a single cell multicast control channel (SC-MCCH). On the subframes with the SC-MCCH, the UE 120 monitors the PDCCH for SC-MCCH scheduling information. Downlink control information (DCI) 1C can be used to indicate a change in information for the SC-MCCH. SC-PTM may use the same protocol stack as eMBMS over multimedia broadcast single frequency network (MBSFN) subframes. SC-PTM may not use PDCP, which results in address encryption issues. SC-PTM may use a radio link control (RLC) unacknowledged mode. In SC-PTM, MAC may use a logical channel identifier (e.g., 11001). SC-PTM configuration parameters are broadcast over the SC-MCCH, such as an MBMS session identifier, scheduling information, neighbor cell information, a group radio network temporary identifier (G-RNTI), and/or the like. RNTI-specific connected mode discontinuous reception (C-DRX) is used, and SC-PTM is not multiplexed with unicast and multicast channels. Some optimizations may be specified for SC-PTM service continuity. The physical layer uses common search space based scheduling, does not use ACK/NACK feedback, does not use HARQ, and uses a normal cyclic prefix.

Furthermore, eMBMS and SC-PTM are typically used for delay insensitive traffic (e.g., 100 ms or more, 300 ms or more, and/or the like) in a broad geographic area, whereas Ethernet traffic over 5G may require high reliability and low latency (e.g., under 100 ms, under 50 ms, under 10 ms, a few milliseconds, and/or the like), and/or may be targeted at a small geographic area (e.g., a single cell or a small cluster of cells, such as in a factory automation or Industrial Internet of Things (IIoT) use case). For example, eMBMS is designed for broadcast delay insensitive traffic in a broad geographic area. As a result, SC-PTM was introduced for public safety and group communication applications with, for example, a small broadcast area, a shorter call setup delay (e.g., less than 300 ms), and a shorter user plane delay (e.g., less than 150 ms). Still further, eMBMS and/or SC-PTM may forego traffic encryption, such as when PDCP is not used for such services. Also, these services may not support acknowledgement or negative acknowledgement (ACK/NACK) feedback. Some techniques and apparatuses described herein address these and other issues relating to Ethernet over WWAN, thereby improving reliability (e.g., to 1e-5, 1e-6, and/or the like), reducing latency (e.g., to a few milliseconds), increasing flexibility, increasing security, and/or the like (e.g., as compared to eMBMS, SC-PTM, and/or the like). Additional details are described below.

Figure 3:
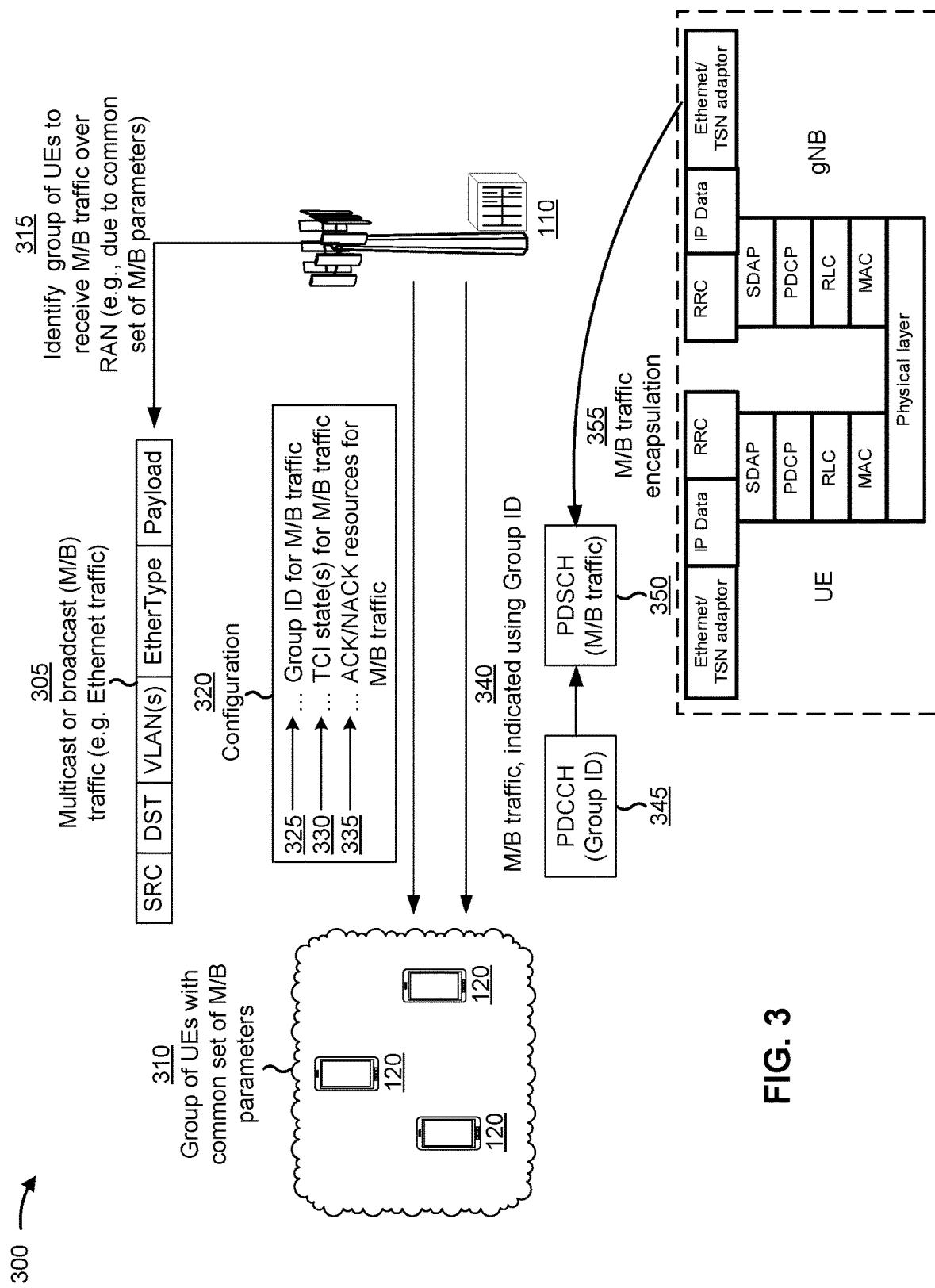
FIGS. 3-5 are diagrams illustrating examples of multicast or broadcast Ethernet traffic transmissions over a radio access network, in accordance with various aspects of the present disclosure.

FIG. 3 is a diagram illustrating an example 300 of multicast or broadcast Ethernet traffic transmissions over a radio access network, in accordance with various aspects of the present disclosure.

As shown in FIG. 3, a base station 110 and a group of UEs 120 may communicate with one another, such as by transmitting multicast or broadcast (M/B) traffic, such as M/B Ethernet traffic, over an air interface (e.g., a WWAN interface) (e.g., using antenna 234, controller/processor 240, receiver processor 238, and/or transmit processor 220 of base station 110, using antenna 252, controller/processor 280, receive processor 258, and/or transmit processor 264 of UE 120). Although some examples are described herein using M/B Ethernet traffic, some techniques and apparatuses described herein may equally apply to other types of M/B traffic, such as M/B LAN traffic, M/B VLAN traffic, M/B non-IP traffic, M/B traffic that includes M/B information at a MAC layer of an Ethernet protocol (e.g., as opposed to a MAC layer of a wireless protocol), M/B traffic of a wired protocol, M/B traffic that is encapsulated for over-the-air (OTA) transmission (e.g., using PDCP, service data adaptation protocol (SDAP), and/or the like), and/or other types of M/B traffic.

As shown by reference number 305, the M/B traffic may include one or more parameters in one or more fields (e.g., of a header and/or a payload of the M/B traffic). For example, a header of M/B Ethernet traffic may include a source address identifier (e.g., a source media access control (MAC) address and/or the like, shown as SRC), a destination address identifier (e.g., a destination MAC address and/or the like, shown as DST), a VLAN tag (e.g., a single VLAN tag for single tagging or two VLAN tags for double tagging), and/or an EtherType identifier used to indicate the type of protocol encapsulated in the payload of the Ethernet frame and/or the size of the Ethernet frame. As further shown, the MB Ethernet traffic may include a payload. The header may be generated and/or read by components of base station 110 and/or UE 120, such as antenna 234, controller/processor 240, receiver processor 238, and/or transmit processor 220 of base station 110, or antenna 252, controller/processor 280, receive processor 258, and/or transmit processor 264 of UE 120.

In some aspects, a VLAN tag field may be referred to as an 802.1Q tag, and may include a tag protocol identifier (TPID) field and a tag control information field. The tag control information field may include a priority code point (PCP) field, a drop eligible indicator (DEI) field, and a VLAN identifier (VID) field. In some aspects, if the Ethernet header includes a single VLAN tag field, that VLAN tag field may be referred to as a customer tag (C-TAG) field. In some aspects, if the Ethernet header includes two VLAN tag fields, one of the VLAN tag fields may be referred to as a customer tag (C-TAG) field, and the other VLAN tag field may be referred to as a service tag (S-TAG) field.

As shown by reference number 310, the group of UEs 120 may be associated with a common set of MB parameters. For example, the group of UEs 120 may be associated with the same value or a same range of values for one or more fields of the MB traffic. For MB Ethernet traffic, the group of UEs 120 may be associated with, for example, the same destination address, the same VLAN (e.g., a single VLAN for single tagging or two VLANs for double tagging), the same EtherType, and/or the like (e.g., a same set of parameter values for a set of fields used for packet filtering). For example, the group of UEs 120 may be associated with the same MB destination address (e.g., which may include an indicator, such as a specific bit, that indicates that the traffic is M/B traffic) and/or the same VLAN. In some aspects, a specific UE 120 may be included in multiple groups of UEs 120 that are associated with different set of M/B parameters (e.g., when the UE 120 is part of multiple VLANs and/or the like).

As shown by reference number 315, the base station 110 may identify (e.g., using controller/processor 240, receiver processor 238, memory 242, and/or the like) the group of UEs 120 to receive the M/B traffic over a RAN (e.g., a 5G RAN, a 4G RAN, and/or the like). In some aspects, the base station 110 may identify these UEs 120 based at least in part on a determination that these UEs 120 share a common set of M/B parameters in the M/B traffic (e.g., the same M/B destination address, the same VLAN, and/or the like). Additionally, or alternatively, the base station 110 may identify these UEs 120 based at least in part on information received from a core network device (e.g., a network controller 130 and/or the like). For example, the core network device may indicate the UEs 120 to be included in a M/B group (e.g., the group of UEs 120), and/or may indicate the values of the fields of M/B traffic to be transmitted to the M/B group.

As shown by reference number 320, the base station 110 (e.g., using controller/processor 240, memory 242, transmit processor 220, TX MIMO processor 230, MOD 232, antenna 234, and/or the like) may transmit, and the UEs 120 (e.g., using antenna 252, DEMOD 254, MIMO detector 256, receive processor 258, controller/processor 280, memory 282, and/or the like) may receive, a configuration associated with M/B grouping and/or M/B traffic. In some aspects, some or all of the configuration may be transmitted in a radio resource control (RRC) message, such as an RRC configuration message, an RRC reconfiguration message, and/or the like. Additionally, or alternatively, some or all of the configuration may be transmitted in a MAC-CE. In some aspects, the base station 110 may create, update, and/or delete a configuration for a group of UEs 120. In some aspects, the base station 110 may signal a change to a configuration by signaling a change in a PDCCH monitoring periodicity. In some aspects, the configuration may be specific to a base station 110. In some aspects, the configuration may be used across a set of base stations 110.

As shown by reference number 325, in some aspects, the configuration may include a group identifier that identifies the group of UEs 120. For example, the group identifier may include a group radio network temporary identifier (RNTI). The group RNTI (G-RNTI) may be used by the UEs 120 to identify communications associated with the M/B traffic, such as downlink control information (DCI) (e.g., on a physical downlink control channel (PDCCH)) for the M/B traffic, a physical downlink shared channel (PDSCH) communication that includes the M/B traffic, and/or the like. In some aspects, the G-RNTI may be used to scramble both downlink communications and uplink communications associated with a group of UEs 120.

In some aspects, the group identifier may include a G-RNTI, and different G-RNTIs may be assigned to different groups of UEs 120 that are associated with M/B traffic having different sets of parameters (e.g., different destination addresses, different VLANs, and/or the like). In this way, UEs 120 in different groups can identify M/B traffic intended for the different groups. This may conserve computing resources of a UE 120 (e.g., processing resources, memory resources, and/or the like) by preventing the UE 120 from decoding and/or processing of M/B traffic intended for a group of UEs 120 that does not include the UE 120.

Alternatively, in some aspects, the same G-RNTI may be assigned to different groups of UEs 120 that are associated with M/B traffic having different sets of parameters. In this case, the group identifier may be an identifier other than a G-RNTI, and may be included in a PDCCH communication and/or a PDSCH communication associated with the M/B traffic to distinguish M/B traffic for different groups of UEs 120. In this case, UEs 120 in different groups may be capable of descrambling the PDCCH communication using the common G-RNTI, and a UE 120 may read the PDCCH communication to determine whether a corresponding PDSCH communication includes M/B traffic for the UE 120. For example, if the PDCCH communication includes a group identifier associated with the UE 120, then the UE 120 may determine that a corresponding PDSCH communication includes M/B traffic for the UE 120. In this way, multiple groups of UEs 120 may be scheduled using the same PDCCH communication (e.g., which may indicate different PDSCH resources for different groups of UEs 120), thereby conserving network resources.

Additionally, or alternatively, the configuration may indicate a first RNTI for PDCCH communications associated with M/B traffic for a group of UEs 120 and a second RNTI for PDSCH communications that carry the M/B traffic intended for the group of UEs 120. In some aspects, the first RNTI may be the same across multiple groups of UEs 120, and the second RNTI may be different for different groups of UEs 120.

As shown by reference number 330, in some aspects, the configuration may indicate one or more permitted transmission configuration indicator (TCI) states for the group of UEs 120 (e.g., a set of permitted TCI states for the PDSCH). In some aspects, these TCI states may be used for the M/B traffic, and may be different from a set of TCI states used by a specific UE 120, included in the group of UEs 120, for unicast traffic (e.g., for unicast communication between the base station 110 and the specific UE 120). For example, a TCI state for a specific UE 120 may be more finely tuned, such that a narrower beam can be used to communicate with the specific UE 120, as compared to a TCI state for the group of UEs 120, which may need to use a wider beam to improve reliability of communications with the entire group of UEs 120. In some aspects, the one or more permitted TCI states for the group of UEs 120 may be signaled in an RRC message. Additionally, or alternatively, the one or more permitted TCI states may be signaled in a MAC control element (MAC-CE), which may allow for dynamic reconfiguration.

Additionally, or alternatively, the configuration may include a configuration for beam management reporting for the group of UEs 120. In some aspects, beam management reporting for MB traffic may be configured differently than beam management reporting for unicast traffic (e.g., more or less frequent reporting, reporting of different sets of beams, and/or the like). In this way, beam management can be flexibly configured depending on the requirements and/or characteristics of different types of traffic.

In some aspects, the configuration may include a scheduling offset threshold for MB traffic (e.g., when the MB traffic is transmitted via beams, such as in frequency range 2 or millimeter wave). Additionally, or alternatively, the UE 120 may report a scheduling offset threshold (e.g., selected from multiple scheduling offset threshold values, if supported) for MB traffic to the base station 110 (e.g., in a UE capability report). Additionally, or alternatively, if the UE 120 is in an idle state, then the base station 110 may use a highest value of the scheduling offset threshold, selected from a set of possible scheduling offset threshold values. The scheduling offset threshold may indicate a minimum duration (e.g., a number of symbols, a number of slots, and/or the like), due to a UE capability (e.g., a beam switching capability), between DCI and a corresponding PDSCH communication scheduled by the DCI. If the PDSCH communication is scheduled at a time period greater than or equal to the minimum duration from the DCI, then the PDSCH communication may be scheduled and/or transmitted using a different beam (e.g., based at least in part on a different quasi co-location (QCL) assumption) than the DCI (e.g., the PDCCH that carries the DCI), and the beam for the PDSCH communication may be indicated in the DCI (e.g., in an N-bit TCI field in the assignment DCI). If the PDSCH communication is scheduled at a time period less than the minimum duration from the DCI, then the PDSCH communication may be required to be scheduled on a default beam (e.g., the same beam as the PDCCH communication, a beam having TCI state used for a control channel having a lowest CORESET identifier in a slot, a beam having a same QCL assumption as the PDCCH communication, and/or the like).

In some aspects, a scheduling offset threshold for M/B traffic may be different than a scheduling offset threshold for unicast traffic, and one or more scheduling offset thresholds may be indicated in a UE capability report, indicated in a configuration (e.g., in an RRC message and/or the like), negotiated between the UE 120 and the base station 110, and/or the like. Additionally, or alternatively, the base station 110 may receive an indication of multiple scheduling offset thresholds (e.g., one from each UE 120 in the group of UEs 120), and may select the highest scheduling offset threshold (e.g., having the longest duration), of the multiple scheduling offset thresholds, as the scheduling offset threshold for the group. In this way, M/B traffic may be transmitted in a PDSCH communication scheduled in such as manner so as to permit reception by all of the UEs 120 in the group.

As shown by reference number 335, in some aspects, the configuration may indicate physical uplink control channel (PUCCH) resources to be used by UEs 120, in the group of UEs 120, for acknowledgment or negative acknowledgement (ACK/NACK) feedback. In some aspects, the configuration may indicate a set of PUCCH resources (e.g., one or more PUCCH resources) for each UE 120 in the group. Additionally, or alternatively, the configuration may indicate different PUCCH resource(s) for different UEs 120 in the group. In this way, the base station 110 may be able to map ACK/NACK feedback received in a specific PUCCH resource to a specific UE 120 in the group, thereby reducing ambiguity in ACK/NACK feedback. Additionally, or alternatively, if a UE 120 is scheduled to transmit ACK/NACK feedback for PDSCH communications other than the M/B traffic (e.g., for a unicast communication, for an SPS communication, and/or the like), then the UE 120 may multiplex ACK/NACK feedback for a PDSCH communication that includes M/B traffic with ACK/NACK feedback for one or more PDSCH communications that do not include M/B traffic.

In some aspects, the base station 110 (e.g., using controller/processor 240, transmit processor 220, TX MIMO processor 230, MOD 232, antenna 234, and/or the like) may retransmit the PDSCH communication, including the M/B traffic, based at least in part on the ACK/NACK feedback. For example, if the base station 110 does not receive an ACK from at least one UE 120 in the group, then the base station 110 may retransmit the PDSCH communication. In some aspects, UEs 120 that already received the PDSCH communication may discard the retransmission. Additionally, or alternatively, in some aspects, the base station 110 may retransmit the M/B traffic as unicast traffic directed to the specific UEs 120 that did not receive the PDSCH communication.

In some aspects, the base station 110 (e.g., using controller/processor 240, transmit processor 220, TX MIMO processor 230, MOD 232, antenna 234, and/or the like) may retransmit the PDSCH communication, including the M/B traffic, a preconfigured or prespecified number of times. In some aspects, the number of retransmissions may be indicated in the configuration. Additionally, or alternatively, the number of retransmissions may be based at least in part on a wireless communication standard. In some aspects, if the base station 110 uses a preconfigured or prespecified number of retransmissions, then the base station 110 may not indicate PUCCH resources for ACK/NACK feedback, and/or the UEs 120 may not transmit ACK/NACK feedback in response to the PDSCH communication that includes the M/B traffic.

Additionally, or alternatively, the configuration may indicate a traffic type associated with the M/B traffic. The traffic type may indicate, for example, a quality of service (QoS) class associated with the M/B traffic, a QoS class indicator (QCI) value associated with the M/B traffic, a latency requirement associated with the M/B traffic, a reliability requirement associated with the M/B traffic, a bearer associated with the M/B traffic, and/or the like. Additionally, or alternatively, the configuration may indicate a periodicity associated with the M/B traffic. For example, the configuration may indicate a periodicity of PDSCH communications that carry M/B traffic, such as for semi-persistent scheduling (SPS), configured scheduling, and/or the like. Additionally, or alternatively, the configuration may indicate a periodicity of PDCCH communications that include DCI for the M/B traffic (e.g., a periodicity for PDCCH monitoring). Additionally, or alternatively, the configuration may indicate a search space configuration for the PDCCH associated with the M/B traffic, a control resource set (CORESET) configuration for the PDCCH associated with the M/B traffic, and/or the like.

As shown by reference number 340, the base station 110 (e.g., using controller/processor 240, transmit processor 220, TX MIMO processor 230, MOD 232, antenna 234, and/or the like) may transmit, and the UEs 120 (e.g., using antenna 252, DEMOD 254, MIMO detector 256, receive processor 258, controller/processor 280, memory 282, and/or the like) may receive, the MB traffic over the RAN. In some aspects, the MB traffic may be transmitted in a PDSCH communication. In some aspects, the PDSCH communication may be scheduled using a PDCCH communication (e.g., DCI and/or the like). Additionally, or alternatively, the PDCCH communication may include other control information for the PDSCH communication, such as a modulation and coding scheme used for the PDSCH communication, an indication of one or more physical uplink control channel (PUCCH) resources to be used for acknowledging or negatively acknowledging the PDSCH communication, and/or the like.

In some aspects, the group identifier may be used to indicate the MB traffic to the group of UEs. As shown by reference number 345, in some aspects, the group identifier may be used for a PDCCH communication that schedules a PDSCH communication that includes the MB traffic. For example, the PDCCH communication may be scrambled using the group identifier (e.g., a G-RNTI). Additionally, or alternatively, the PDCCH communication may include the group identifier.

As shown by reference number 350, the MB traffic may be included in a PDSCH communication. In some aspects, a UE 120, included in the group of UEs 120, may receive a PDCCH communication, may descramble the PDCCH communication using the group identifier (e.g., a G-RNTI), and/or may determine that the PDCCH communication schedules a PDSCH that includes MB traffic based at least in part on successful descrambling of the PDCCH communication using the group identifier. The UE 120 may obtain the PDSCH communication based at least in part on scheduling information and/or other control information included in the PDCCH communication, and may process the PDSCH communication based at least in part on determining that the PDSCH communication includes MB traffic (e.g., by using a common key for decryption, by using a transmission configuration indicator (TCI) state associated with M/B traffic, by transmitting ACK/NACK feedback in the appropriate PUCCH resource(s), by discarding M/B traffic that originated at the UE 120, and/or the like). Such processing is described in more detail elsewhere herein.

For example, as shown by reference number 355, upper layer information, such as the M/B traffic (e.g., shown as Ethernet/Time-Sensitive Network (TSN) traffic from an Ethernet/TSN adaptor), may be encapsulated using one or more lower layer protocols for transmission over a physical layer (e.g., over an air interface). For example, as described elsewhere herein, the M/B traffic may be encapsulated using SDAP, PDCP, a radio link control (RLC) protocol, a media access control (MAC) protocol for OTA communications, and/or the like. For downlink communications, the base station 110 may encapsulate the M/B traffic using such protocols (e.g., by adding protocol headers), and may transmit the encapsulated traffic to the UE 120. The UE 120 may decapsulate the encapsulated traffic (e.g., by reading and/or removing the protocol headers) to obtain the M/B traffic. For uplink communications, the UE 120 may encapsulate the M/B traffic using such protocols (e.g., by adding protocol headers), and may transmit the encapsulated traffic to the base station 110. The base station 110 may decapsulate the encapsulated traffic (e.g., by reading and/or removing the protocol headers) to obtain the M/B traffic.

In this way, M/B Ethernet traffic and/or similar M/B traffic may be transmitted over a WWAN to with appropriate delivery of the M/B traffic, M/B traffic-specific handling of beams (e.g., for millimeter wave communications), ACK/NACK feedback for the M/B traffic, and/or the like. This may improve reliability, reduce latency, increase flexibility, increase security, and/or the like (e.g., as compared to eMBMS, SC-PTM, and/or the like).

As indicated above, FIG. 3 is provided as an example. Other examples are possible and may differ from what was described with respect to FIG. 3.

Figure 4:
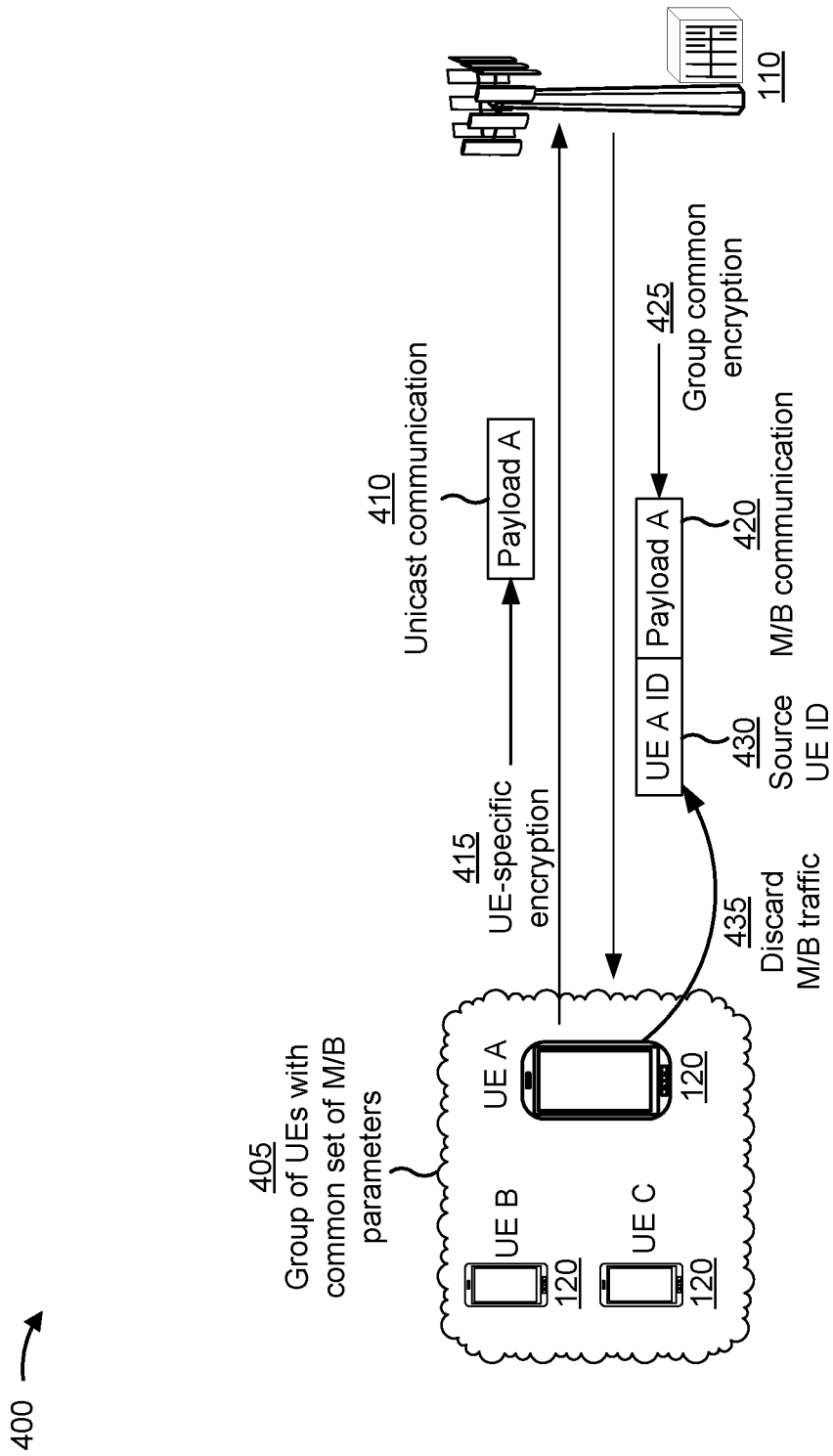

FIG. 4 is a diagram illustrating an example 400 of multicast or broadcast Ethernet traffic transmissions over a radio access network, in accordance with various aspects of the present disclosure.

As shown in FIG. 4, a base station 110 and a group of UEs 120 may communicate with one another, such as by transmitting MB traffic, such as MB Ethernet traffic, over an air interface (e.g., a WWAN interface), as described above in connection with FIG. 3 (e.g., using antenna 234, controller/processor 240, receiver processor 238, and/or transmit processor 220 of base station 110, using antenna 252, controller/processor 280, receive processor 258, and/or transmit processor 264 of UE 120). As shown by reference number 405, the group of UEs 120 may be associated with a common set of MB parameters, as described above in connection with FIG. 3.

As shown by reference number 410, in some aspects, a specific UE 120, included in the group of UEs 120, may transmit (e.g., using controller/processor 280, transmit processor 264, TX MIMO processor 266, MOD 254, antenna 252, memory 282, and/or the like) unicast traffic to the base station 110. Although the specific UE 120 is shown as part of the group, the specific UE 120 may not be part of the group in some aspects. Additionally, or alternatively, the base station 110 and/or one or more other base stations 110 may be part of the group. The unicast traffic may be intended for the group of UEs 120, and may include information that identifies the common set of MB parameters associated with the group. For example, the common set of MB parameters may be indicated in an Ethernet header, a MAC header, and/or the like. In some aspects, the header (and/or an Ethernet payload) may be encapsulated in a payload of a physical uplink shared channel (PUSCH) communication and transmitted over an air interface to the base station 110.

As shown by reference number 415, the unicast communication from the specific UE 120 to the base station 110 may be encrypted and/or decrypted using UE-specific encryption (e.g., a UE-specific key) (e.g., using controller/processor 280, memory 282, and/or the like). Alternatively, the unicast communication may be encrypted and/or decrypted using a common key that is shared across the group of UEs 120.

The base station 110 (e.g., using antenna 234, DEMOD 232, MIMO detector 236, receive processor 238, controller/processor 240, memory 242, and/or the like) may receive the unicast communication (e.g., on the uplink). The base station 110 may decrypt the unicast communication (e.g., using a UE-specific key, a group common key, and/or the like) (e.g., using controller/processor 240, memory 242, and/or the like). The base station 110 may determine (e.g., using controller/processor 240, receive processor 238, memory 242, and/or the like) that a payload of the unicast communication is intended for the group of UEs 120 (e.g., by determining that the common set of MB parameters is included in the unicast communication). Based at least in part on this determination, the base station 110 may generate (e.g., using controller/processor 240, memory 242, transmit processor 220, and/or the like) a MB communication (e.g., based at least in part on the payload of the unicast communication).

As shown by reference number 420, the base station 110 (e.g., using controller/processor 240, transmit processor 220, TX MIMO processor 230, MOD 232, antenna 234, memory 242, and/or the like) may transmit a MB communication to the group of UEs 120 (e.g., in a PDSCH communication), in a similar manner as described above in connection with FIG. 3. As shown by reference number 425, in some aspects, the base station 110 (e.g., using controller/processor 240, memory 242, and/or the like) may encrypt the M/B communication using a common encryption key associated with the group of UEs. In some aspects, one or more parameters of the common encryption key may be indicated in a configuration associated with M/B traffic and/or the group of UEs 120 (e.g., the configuration described above in connection with reference number 320 of FIG. 3).

As shown by reference number 425, in some aspects, the M/B communication may include a source UE identifier that identifies the UE 120 from which the M/B communication originated. In example 400, a UE 120 identified as UE A transmitted the unicast traffic from which the M/B communication was generated, and the M/B communication includes a UE identifier that identifies UE A. The UE identifier may include, for example, a UE-specific RNTI (e.g., a cell RNTI), an international mobile subscriber identity (IMSI), a phone number, a network address (e.g., a MAC address, an IP address, and/or the like), and/or the like.

In some aspects, the source UE identifier may be included in a PDCP field (e.g., of a PDCP header that encapsulates the M/B communication). Additionally, or alternatively, the source UE identifier may be included in a PDCCH communication that schedules the PDSCH communication that includes the M/B payload. In this way, the source UE 120 can conserve resources by refraining from monitoring for and/or decoding a PDSCH communication that includes a payload that originated from the source UE 120. Additionally, or alternatively, the source UE identifier may be included in a MAC-CE associated with the M/B communication. Additionally, or alternatively, the source UE identifier may be included in a PDSCH communication that includes the M/B communication.

As shown by reference number 435, in some aspects, the source UE 120 (e.g., using receive processor 258, controller/processor 280, memory 282, and/or the like) may discard the M/B communication based at least in part on the source UE identifier. For example, if the source UE identifier matches a UE identifier of the source UE 120, then the source UE 120 may discard the M/B communication. Additionally, or alternatively, the source UE 120 may refrain from monitoring for and/or obtaining the M/B communication based at least in part on the source UE identifier (e.g., when the source UE identifier is included in a PDCCH communication that schedules a PDSCH communication that includes the M/B communication). In this way, the source UE 120 may conserve computing resources (e.g., processing resources, memory resources, and/or the like) when the information included in the M/B communication is already stored by and/or known to the source UE 120 (e.g., due to the source UE 120 originating the M/B communication).

As indicated above, FIG. 4 is provided as an example. Other examples are possible and may differ from what was described with respect to FIG. 4.

Figure 5:
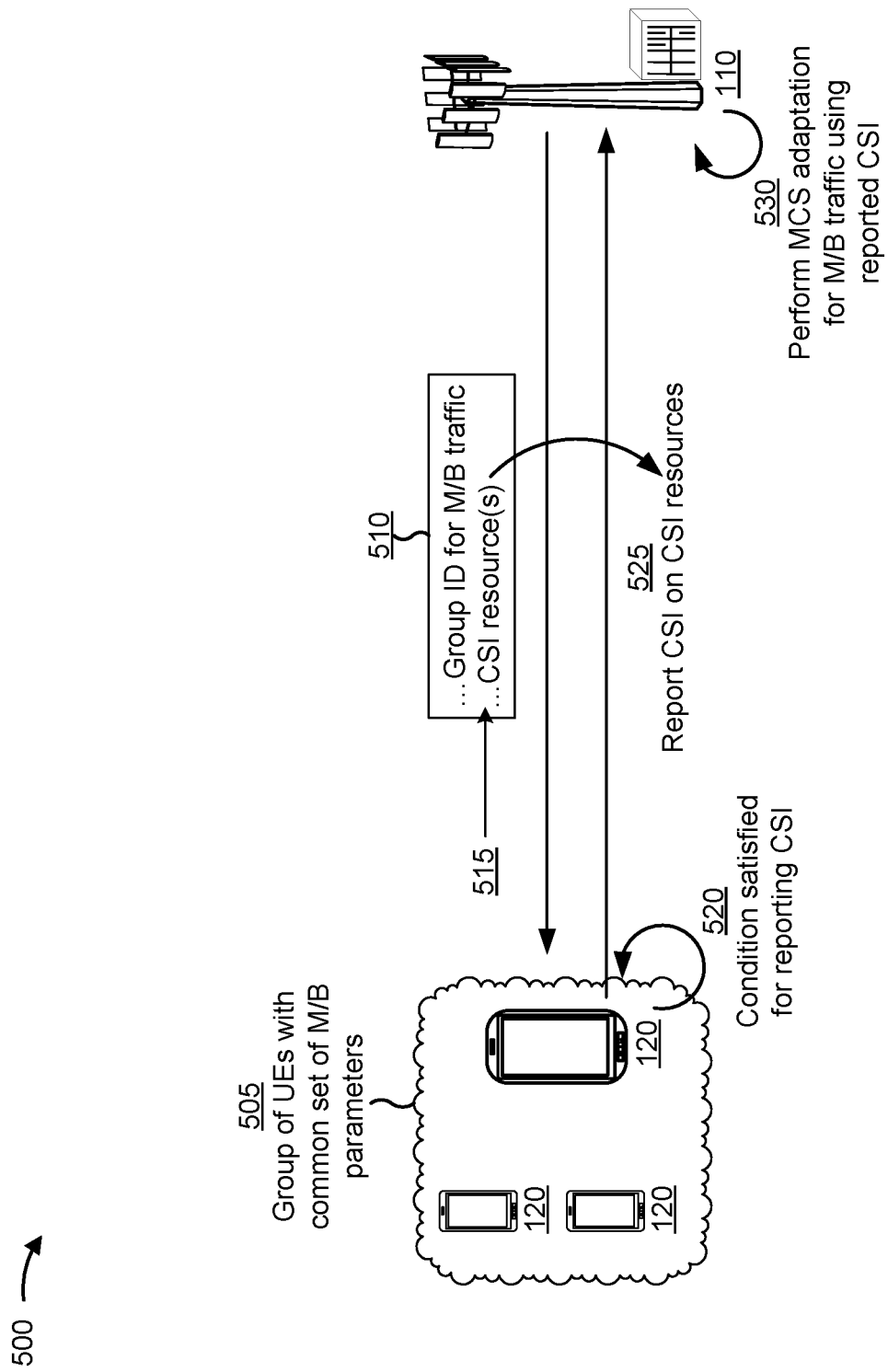

FIG. 5 is a diagram illustrating an example 500 of multicast or broadcast Ethernet traffic transmissions over a radio access network, in accordance with various aspects of the present disclosure.

As shown in FIG. 5, a base station 110 and a group of UEs 120 may communicate with one another, such as by transmitting M/B traffic, such an M/B Ethernet traffic, over an air interface (e.g., a WWAN interface), as described above in connection with FIGS. 3-4 (e.g., using antenna 234, controller/processor 240, receiver processor 238, and/or transmit processor 220 of base station 110, using antenna 252, controller/processor 280, receive processor 258, and/or transmit processor 264 of UE 120). As shown by reference number 505, the group of UEs 120 may be associated with a common set of M/B parameters, as described above in connection with FIGS. 3-4.

As shown by reference number 510, in some aspects, the base station 110 (e.g., using controller/processor 240, memory 242, transmit processor 220, TX MIMO processor 230, MOD 232, antenna 234, and/or the like) may transmit, and the group of UEs 120 (e.g., using antenna 252, DEMOD 254, MIMO detector 256, receive processor 258, controller/processor 280, memory 282, and/or the like) may receive, a configuration associated with M/B traffic, as described above in connection with reference number 320 of FIG. 3. As shown by reference number 515, in some aspects, the configuration may indicate one or more resources (shown as CSI resources) to be used by the group of UEs 120 for transmission of channel state information (CSI) associated with M/B traffic and/or M/B operations described herein.

In some aspects, one or more UEs 120, of the group of UEs 120, may transmit (e.g., using controller/processor 280, transmit processor 264, TX MIMO processor 266, MOD 254, antenna 252, and/or the like) CSI on the CSI resources when a condition is satisfied (e.g., when CSI calculated by the UE 120 for one or more configured and/or designated resources is less than or equal to a threshold). In some aspects, different CSI resources may be configured for different UEs 120 in the group of UEs 120. Additionally, or alternatively, multiple UEs 120 in the group of UEs 120 may be configured with the same CSI resources.

As shown by reference number 520, a UE 120, included in the group of UEs 120, may determine the UE (e.g., using controller/processor 280 and/or the like) that a condition, associated with reporting CSI, is satisfied (e.g., that CSI determined by the UE 120 is less than or equal to a preconfigured and/or prespecified threshold). As shown by reference number 525, based at least in part on this determination, the UE 120 may report (e.g., using controller/processor 280, transmit processor 264, TX MIMO processor 266, MOD 254, antenna 252, and/or the like) CSI to the base station 110 on the CSI resource(s) configured for the UE 120. In some aspects, this event-triggered CSI for MB traffic may be different from other CSI reporting, such as CSI reporting for unicast traffic and/or the like.

As shown by reference number 530, the base station 110 (e.g., using antenna 234, DEMOD 232, MIMO detector 236, receive processor 238, controller/processor 240, and/or the like) may receive the CSI report, and may perform modulation and coding scheme (MCS) adaptation and/or other traffic adaptation (e.g., rate adaptation and/or the like) based at least in part on the CSI report. Such adaptation(s) may apply to future MB communications transmitted to the group of UEs 120. In some aspects, the base station 110 may use the worst reported CSI, among the group of UEs 120, to determine MCS and/or other parameters for the MB communication, thereby increasing reliability for the entire group of UEs 120.

As indicated above, FIG. 5 is provided as an example. Other examples are possible and may differ from what was described with respect to FIG. 5.

Figure 6:
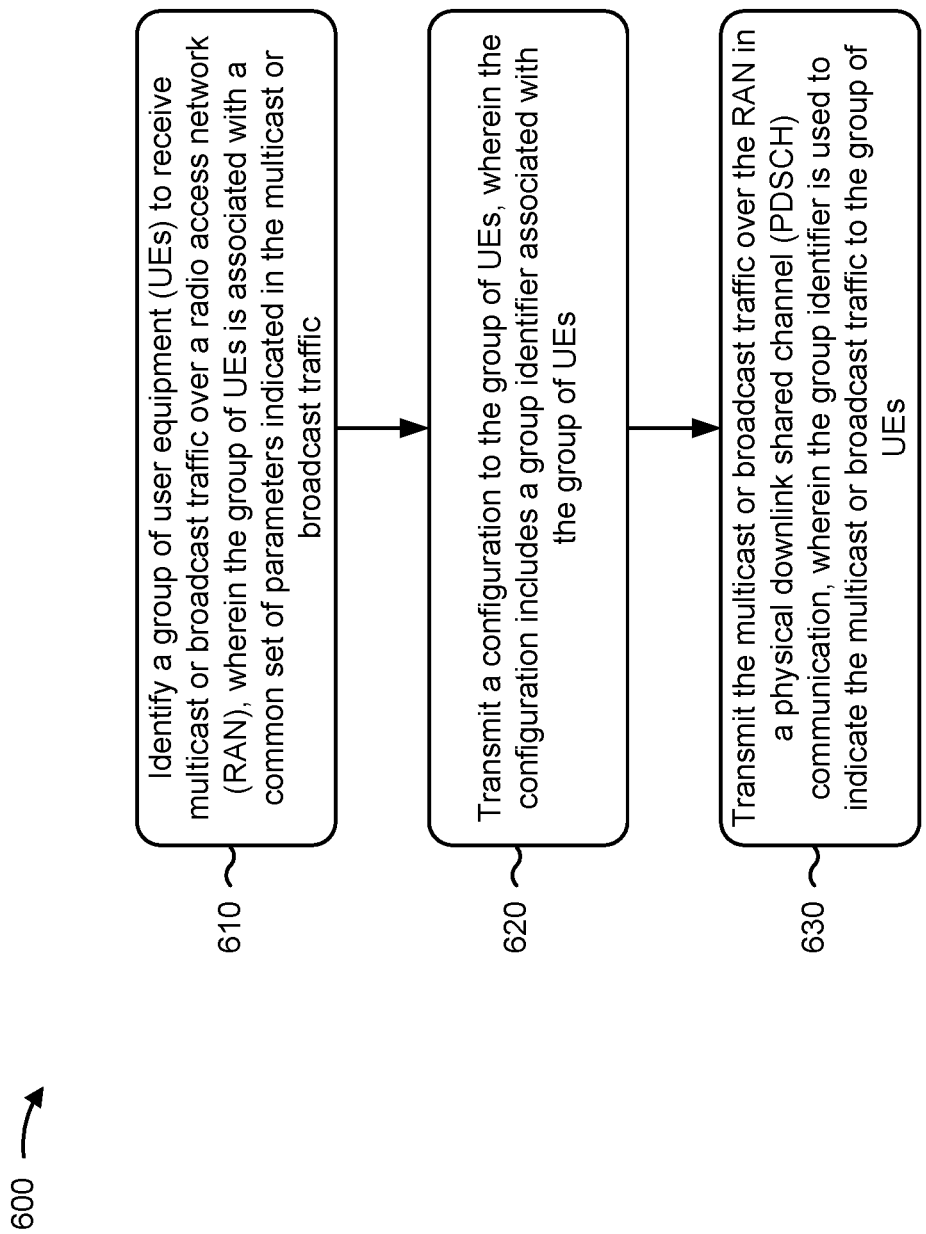
FIGS. 6-7 are diagrams illustrating example processes relating to multicast or broadcast Ethernet traffic transmissions over a radio access network, in accordance with various aspects of the present disclosure.

FIG. 6 is a diagram illustrating an example process 600 performed, for example, by a base station, in accordance with various aspects of the present disclosure. Example process 600 is an example where a base station (e.g., base station 110 and/or the like) performs operations associated with multicast or broadcast Ethernet traffic transmissions over a radio access network.

As shown in FIG. 6, in some aspects, process 600 may include identifying a group of user equipment (UEs) to receive multicast or broadcast traffic over a radio access network (RAN), wherein the group of UEs is associated with a common set of parameters indicated in the multicast or broadcast traffic (block 610). For example, the base station (e.g., using controller/processor 240 and/or the like) may identify a group of UEs to receive multicast or broadcast traffic over a RAN, as described above in connection with FIGS. 3-5. In some aspects, the group of UEs is associated with a common set of parameters indicated in the multicast or broadcast traffic.

As further shown in FIG. 6, in some aspects, process 600 may include transmitting a configuration to the group of UEs, wherein the configuration includes a group identifier associated with the group of UEs (block 620). For example, the base station (e.g., using controller/processor 240, transmit processor 220, TX MIMO processor 230, MOD 232, antenna 234, and/or the like) may transmit a configuration to the group of UEs, as described above in connection with FIGS. 3-5. In some aspects, the configuration includes a group identifier associated with the group of UEs.

As further shown in FIG. 6, in some aspects, process 600 may include transmitting the multicast or broadcast traffic over the RAN in a physical downlink shared channel (PDSCH) communication, wherein the group identifier is used to indicate the multicast or broadcast traffic to the group of UEs (block 630). For example, the base station (e.g., using controller/processor 240, transmit processor 220, TX MIMO processor 230, MOD 232, antenna 234, and/or the like) may transmit the multicast or broadcast traffic over the RAN in a PDSCH communication, as described above in connection with FIGS. 3-5. In some aspects, the group identifier is used to indicate the multicast or broadcast traffic to the group of UEs.

Process 600 may include additional aspects, such as any single aspect or any combination of aspects described below and/or in connection with one or more other processes described elsewhere herein.

In a first aspect, the multicast or broadcast traffic is Ethernet traffic. In a second aspect, alone or in combination with the first aspect, the configuration is transmitted to the group of UEs in a radio resource control (RRC) message. In a third aspect, alone or in combination with one or more of the first and second aspects, the configuration indicates at least one of: a traffic type associated with the multicast or broadcast traffic, a periodicity associated with PDSCH communications of the multicast or broadcast traffic, a periodicity associated with physical downlink control channel (PDCCH) communications that include downlink control information (DCI) for the multicast or broadcast traffic, a search space or control resource set (CORESET) configuration for the PDCCH, or a combination thereof.

In a fourth aspect, alone or in combination with one or more of the first through third aspects, a UE, included in the group of UEs, is included in multiple groups of UEs corresponding to multicast or broadcast traffic having different sets of parameters. In a fifth aspect, alone or in combination with one or more of the first through fourth aspects, each UE, in the group of UEs, is associated with a same virtual local area network (VLAN) identified in the multicast or broadcast traffic. In a sixth aspect, alone or in combination with one or more of the first through fifth aspects, each UE, in the group of UEs, is associated with a same set of parameter values, used for packet filtering, included in the multicast or broadcast traffic. In a seventh aspect, alone or in combination with one or more of the first through sixth aspects, the group identifier is a group radio network temporary identifier. In an eighth aspect, alone or in combination with one or more of the first through seventh aspects, different groups of UEs, associated with multicast or broadcast traffic having different sets of parameters, are associated with different group radio network temporary identifiers.

In a ninth aspect, alone or in combination with one or more of the first through eighth aspects, different groups of UEs, associated with multicast or broadcast traffic having different sets of parameters, are associated with a same group radio network temporary identifier. In a tenth aspect, alone or in combination with one or more of the first through ninth aspects, the group identifier is used to distinguish among the different groups of UEs. In an eleventh aspect, alone or in combination with one or more of the first through tenth aspects, the configuration indicates a first radio network temporary identifier (RNTI) for physical downlink control channel (PDCCH) communications associated with the multicast or broadcast traffic and a second RNTI for PDSCH communications that carry the multicast or broadcast traffic.

In a twelfth aspect, alone or in combination with one or more of the first through eleventh aspects, the configuration indicates different physical uplink control channel (PUCCH) resources to be used by different UEs, in the group of UEs, for acknowledgment or negative acknowledgement (ACK/NACK) feedback. In a thirteenth aspect, alone or in combination with one or more of the first through twelfth aspects, the configuration indicates one or more permitted transmission configuration indicator (TCI) states for the group of UEs. In a fourteenth aspect, alone or in combination with one or more of the first through thirteenth aspects, the one or more permitted TCI states for the group of UEs are different from one or more TCI states used for unicast communication with one or more UEs in the group of UEs. In a fifteenth aspect, alone or in combination with one or more of the first through fourteenth aspects, the one or more permitted TCI states are signaled in a radio resource control (RRC) message or a media access control (MAC) control element.

In a sixteenth aspect, alone or in combination with one or more of the first through fifteenth aspects, beam management reporting is configured separately for unicast traffic and the multicast or broadcast traffic. In a seventeenth aspect, alone or in combination with one or more of the first through sixteenth aspects, the multicast or broadcast traffic is transmitted to the group of UEs based at least in part on a unicast communication received from a UE of the group of UEs. In an eighteenth aspect, alone or in combination with one or more of the first through seventeenth aspects, a scheduling offset threshold used for the multicast or broadcast traffic over the RAN is different from a scheduling offset threshold used for unicast communications. In a nineteenth aspect, alone or in combination with one or more of the first through eighteenth aspects, the multicast or broadcast traffic is transmitted to the group of UEs based at least in part on a unicast communication received from a UE of the group of UEs.

In a twentieth aspect, alone or in combination with one or more of the first through nineteenth aspects, the unicast communication is encrypted using a UE-specific encryption key associated with the UE. In a twenty-first aspect, alone or in combination with one or more of the first through twentieth aspects, the multicast or broadcast traffic is encrypted, prior to transmission to the group of UEs, based at least in part on a common encryption key associated with the group of UEs. In a twenty-second aspect, alone or in combination with one or more of the first through twenty-first aspects, a packet data convergence protocol (PDCP) header, that encapsulates the multicast or broadcast traffic, indicates a source UE, of the group of UEs, from which the multicast or broadcast traffic originated. In a twenty-third aspect, alone or in combination with one or more of the first through twenty-second aspects, process 600 may include transmitting an indication of a source UE, of the group of UEs, from which the multicast or broadcast traffic originated. In a twenty-fourth aspect, alone or in combination with one or more of the first through twenty-third aspects, the source UE is indicated using a source UE identifier included in a physical downlink control channel (PDCCH) communication that schedules the multicast or broadcast traffic or in a media access control (MAC) control element.

In a twenty-fifth aspect, alone or in combination with one or more of the first through twenty-fourth aspects, process 600 may include retransmitting the PDSCH communication based at least in part on acknowledgement or negative acknowledgment (ACK/NACK) feedback indicating that one or more UEs, included in the group of UEs, did not receive the PDSCH communication. In a twenty-sixth aspect, alone or in combination with one or more of the first through twenty-fifth aspects, process 600 may include retransmitting the PDSCH communication a preconfigured or prespecified number of times. In a twenty-seventh aspect, alone or in combination with one or more of the first through twenty-sixth aspects, the configuration indicates one or more resources to be used for transmission of channel state information (CSI), wherein the transmission of the CSI is triggered based at least in part on satisfaction of a condition.

In a twenty-eighth aspect, alone or in combination with one or more of the first through twenty-seventh aspects, process 600 includes performing modulation and coding scheme (MCS) adaptation based at least in part on receiving a report, that includes CSI, from a UE included in the group of UEs.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
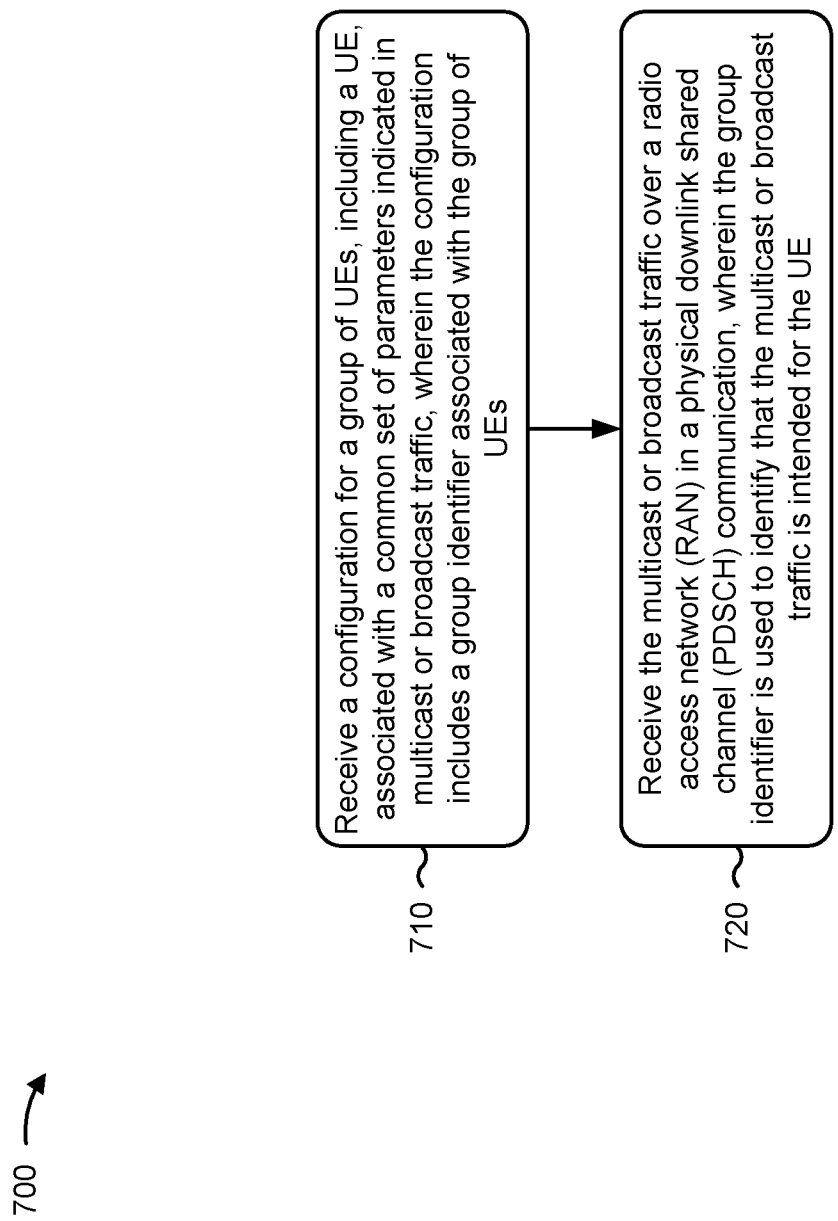

FIG. 7 is a diagram illustrating an example process 700 performed, for example, by a UE, in accordance with various aspects of the present disclosure. Example process 700 is an example where a UE (e.g., UE 120 and/or the like) performs operations associated with multicast or broadcast Ethernet traffic transmissions over a radio access network.

As shown in FIG. 7, in some aspects, process 700 may include receiving a configuration for a group of UEs, including the UE, associated with a common set of parameters indicated in multicast or broadcast traffic, wherein the configuration includes a group identifier associated with the group of UEs (block 710). For example, the UE (e.g., using antenna 252, DEMOD 254, MIMO detector 256, receive processor 258, controller/processor 280, and/or the like) may receive a configuration for a group of UEs, including the UE, associated with a common set of parameters indicated in multicast or broadcast traffic, as described above in connection with FIGS. 3-5. In some aspects, the configuration includes a group identifier associated with the group of UEs.

As further shown in FIG. 7, in some aspects, process 700 may include receiving the multicast or broadcast traffic over a radio access network (RAN) in a physical downlink shared channel (PDSCH) communication, wherein the group identifier is used to identify that the multicast or broadcast traffic is intended for the UE (block 720). For example, the UE (e.g., using antenna 252, DEMOD 254, MIMO detector 256, receive processor 258, controller/processor 280, and/or the like) may receive the multicast or broadcast traffic over a RAN in a PDSCH communication, as described above in connection with FIGS. 3-5. In some aspects, the group identifier is used to identify that the multicast or broadcast traffic is intended for the UE.

Process 700 may include additional aspects, such as any single aspect or any combination of aspects described below and/or in connection with one or more other processes described elsewhere herein.

In a first aspect, the multicast or broadcast traffic is Ethernet traffic. In a second aspect, alone or in combination with the first aspect, the configuration is received in a radio resource control (RRC) message. In a third aspect, alone or in combination with one or more of the first and second aspects, the configuration indicates at least one of: a traffic type associated with the multicast or broadcast traffic, a periodicity associated with PDSCH communications of the multicast or broadcast traffic, a periodicity associated with physical downlink control channel (PDCCH) communications that include downlink control information (DCI) for the multicast or broadcast traffic, a search space or control resource set (CORESET) configuration for the PDCCH, or a combination thereof.

In a fourth aspect, alone or in combination with one or more of the first through third aspects, the UE is included in multiple groups of UEs corresponding to multicast or broadcast traffic having different sets of parameters. In a fifth aspect, alone or in combination with one or more of the first through fourth aspects, each UE, in the group of UEs, is associated with a same virtual local area network (VLAN) identified in the multicast or broadcast traffic. In a sixth aspect, alone or in combination with one or more of the first through fifth aspects, each UE, in the group of UEs, is associated with a same set of parameter values, used for packet filtering, included in the multicast or broadcast traffic.

In a seventh aspect, alone or in combination with one or more of the first through sixth aspects, the group identifier is a group radio network temporary identifier. In an eighth aspect, alone or in combination with one or more of the first through seventh aspects, different groups of UEs, associated with multicast or broadcast traffic having different sets of parameters, are associated with different group radio network temporary identifiers. In a ninth aspect, alone or in combination with one or more of the first through eighth aspects, different groups of UEs, associated with multicast or broadcast traffic having different sets of parameters, are associated with a same group radio network temporary identifier.

In a tenth aspect, alone or in combination with one or more of the first through ninth aspects, the group identifier is used to distinguish among the different groups of UEs. In an eleventh aspect, alone or in combination with one or more of the first through tenth aspects, the configuration indicates a first radio network temporary identifier (RNTI) for physical downlink control channel (PDCCH) communications associated with the multicast or broadcast traffic and a second RNTI for PDSCH communications that carry the multicast or broadcast traffic. In a twelfth aspect, alone or in combination with one or more of the first through eleventh aspects, the configuration indicates different physical uplink control channel (PUCCH) resources to be used by different UEs, in the group of UEs, for acknowledgment or negative acknowledgement (ACK/NACK) feedback.

In a thirteenth aspect, alone or in combination with one or more of the first through twelfth aspects, the configuration indicates one or more permitted transmission configuration indicator (TCI) states for the group of UEs. In a fourteenth aspect, alone or in combination with one or more of the first through thirteenth aspects, the one or more permitted TCI states for the group of UEs are different from one or more TCI states used for unicast communication with one or more UEs in the group of UEs. In a fifteenth aspect, alone or in combination with one or more of the first through fourteenth aspects, the one or more permitted TCI states are signaled in a radio resource control (RRC) message or a media access control (MAC) control element.

In a sixteenth aspect, alone or in combination with one or more of the first through fifteenth aspects, beam management reporting is configured separately for unicast traffic and the multicast or broadcast traffic. In a seventeenth aspect, alone or in combination with one or more of the first through sixteenth aspects, the multicast or broadcast traffic is received based at least in part on a unicast communication transmitted by the UE and associated with the group of UEs. In an eighteenth aspect, alone or in combination with one or more of the first through seventeenth aspects, a scheduling offset threshold used for the multicast or broadcast traffic over the RAN is different from a scheduling offset threshold used for unicast communications.

In a nineteenth aspect, alone or in combination with one or more of the first through eighteenth aspects, the multicast or broadcast traffic is received based at least in part on a unicast communication transmitted by the UE and associated with the group of UEs, wherein the unicast communication is encrypted using a UE-specific encryption key associated with the UE. In a twentieth aspect, alone or in combination with one or more of the first through nineteenth aspects, the multicast or broadcast traffic is encrypted based at least in part on a common encryption key associated with the group of UEs. In a twenty-first aspect, alone or in combination with one or more of the first through twentieth aspects, a packet data convergence protocol (PDCP) header, that encapsulates the multicast or broadcast traffic, indicates a source UE, of the group of UEs, from which the multicast or broadcast traffic originated.

In a twenty-second aspect, alone or in combination with one or more of the first through twenty-first aspects, process 700 includes receiving an indication of a source UE, of the group of UEs, from which the multicast or broadcast traffic originated. In a twenty-third aspect, alone or in combination with one or more of the first through twenty-second aspects, the source UE is indicated using a source UE identifier included in a physical downlink control channel (PDCCH) communication that schedules the multicast or broadcast traffic or in a media access control (MAC) control element. In a twenty-fourth aspect, alone or in combination with one or more of the first through twenty-third aspects, the UE is configured to discard, refrain from monitoring for, or refrain from obtaining the multicast or broadcast traffic when the UE is the source UE.

In a twenty-fifth aspect, alone or in combination with one or more of the first through twenty-fourth aspects, process 700 includes receiving a retransmission of the PDSCH communication based at least in part on transmitting acknowledgement or negative acknowledgment (ACK/NACK) feedback. In a twenty-sixth aspect, alone or in combination with one or more of the first through twenty-fifth aspects, process 700 includes receiving a retransmission of the PDSCH communication a preconfigured or prespecified number of times. In a twenty-seventh aspect, alone or in combination with one or more of the first through twenty-sixth aspects, the configuration indicates one or more resources to be used for transmission of channel state information (CSI), wherein the transmission of the CSI is triggered based at least in part on satisfaction of a condition. In a twenty-eighth aspect, alone or in combination with one or more of the first through twenty-seventh aspects, process 700 includes transmitting CSI using one or more uplink resources based at least in part on a determination that a CSI trigger condition is satisfied.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a network entity, comprising:
   identifying a group of user equipment (UEs) to receive multicast or broadcast traffic over a radio access network (RAN) based on the group of UEs sharing a common set of parameters indicated in the multicast or broadcast traffic, wherein a UE, of the group of UEs, is included in the group of UEs and a different group of UEs associated with a different common set of parameters, wherein the UE is part of multiple virtual local area networks (VLANs), wherein the common set of parameters includes a first VLAN of the multiple VLANs, and wherein the different common set of parameters include a second VLAN of the multiple VLANs;
   transmitting a configuration to the group of UEs, wherein the configuration includes a group identifier assigned to the group of UEs and the different group of UEs; and
   transmitting the multicast or broadcast traffic over the RAN in a physical downlink shared channel (PDSCH) communication, wherein the group identifier is used to indicate the multicast or broadcast traffic to the group of UEs.

2. The method of claim 1, wherein the configuration indicates one or more permitted transmission configuration indicator (TCI) states for the group of UEs.

3. The method of claim 2, wherein the one or more permitted TCI states for the group of UEs are:
   different from one or more TCI states used for unicast communication with one or more UEs in the group of UEs,
   signaled in a radio resource control (RRC) message or a media access control (MAC) control element, or
   a combination thereof.

4. The method of claim 1, wherein a packet data convergence protocol (PDCP) header, that encapsulates the multicast or broadcast traffic, indicates a source UE, of the group of UEs, from which the multicast or broadcast traffic originated.

5. The method of claim 1, further comprising transmitting an indication of a source UE, of the group of UEs, from which the multicast or broadcast traffic originated.

6. The method of claim 1, wherein the multicast or broadcast traffic is Ethernet traffic.

7. The method of claim 1, wherein each UE, in the group of UEs, is associated with a same set of parameter values, used for packet filtering, included in the multicast or broadcast traffic.

8. The method of claim 1, further comprising retransmitting the PDSCH communication based at least in part on acknowledgement or negative acknowledgment (ACK/NACK) feedback indicating that one or more UEs, included in the group of UEs, did not receive the PDSCH communication.

9. A method of wireless communication performed by a user equipment (UE), comprising:
   receiving a configuration for a group of UEs, including the UE, that is identified based on the group of UEs sharing a common set of parameters indicated in multicast or broadcast traffic, wherein the UE is included in the group of UEs and a different group of UEs associated with a different common set of parameters, wherein the UE is part of multiple virtual local area networks (VLANs), wherein the common set of parameters includes a first VLAN of the multiple VLANs, wherein the different common set of parameters include a second VLAN of the multiple VLANs, and wherein the configuration includes a group identifier assigned to the group of UEs and the different group of UEs; and
   receiving the multicast or broadcast traffic over a radio access network (RAN) in a physical downlink shared channel (PDSCH) communication, wherein the group identifier is used to identify that the multicast or broadcast traffic is intended for the UE.

10. The method of claim 9, wherein the configuration indicates at least one of:
    a first radio network temporary identifier (RNTI) for physical downlink control channel (PDCCH) communications associated with the multicast or broadcast traffic and a second RNTI for PDSCH communications that carry the multicast or broadcast traffic,
    different physical uplink control channel (PUCCH) resources to be used by different UEs, in the group of UEs, for acknowledgment or negative acknowledgement (ACK/NACK) feedback,
    one or more permitted transmission configuration indicator (TCI) states for the group of UEs, one or more resources to be used for transmission of channel state information (CSI), wherein the transmission of the CSI is triggered based at least in part on satisfaction of a condition, or a combination thereof.

11. The method of claim 10, wherein the one or more permitted TCI states are:

different from one or more TCI states used for unicast communication with one or more UEs in the group of UEs, signaled in a radio resource control (RRC) message or a media access control (MAC) control element, or a combination thereof.

12. The method of claim 9, wherein a packet data convergence protocol (PDCP) header, that encapsulates the multicast or broadcast traffic, indicates a source UE, of the group of UEs, from which the multicast or broadcast traffic originated.

13. The method of claim 9, further comprising receiving an indication of a source UE, of the group of UEs, from which the multicast or broadcast traffic originated.

14. The method of claim 13, wherein the source UE is indicated using a source UE identifier included in a physical downlink control channel (PDCCH) communication that schedules the multicast or broadcast traffic or in a media access control (MAC) control element.

15. The method of claim 13, wherein the UE is configured to discard, refrain from monitoring for, or refrain from obtaining the multicast or broadcast traffic when the UE is the source UE.

16. The method of claim 9, wherein the multicast or broadcast traffic is Ethernet traffic.

17. The method of claim 9, wherein the UE is included in multiple groups of UEs corresponding to multicast or broadcast traffic having different sets of parameters.

18. The method of claim 9, wherein each UE, in the group of UEs, is associated with a same set of parameter values, used for packet filtering, included in the multicast or broadcast traffic.

19. The method of claim 9, wherein the group identifier is a group radio network temporary identifier.

20. The method of claim 9, wherein the configuration includes a configuration for beam management reporting for the group of UEs, and wherein the beam management reporting is configured separately for unicast traffic and the multicast or broadcast traffic.

21. The method of claim 9, wherein a scheduling offset threshold used for the multicast or broadcast traffic over the RAN is different from a scheduling offset threshold used for unicast communications.

22. The method of claim 9, wherein the multicast or broadcast traffic is received based at least in part on a unicast communication transmitted by the UE and associated with the group of UEs, wherein the unicast communication is encrypted using a UE-specific encryption key associated with the UE.

23. The method of claim 9, wherein the multicast or broadcast traffic is encrypted based at least in part on a common encryption key associated with the group of UEs.

24. The method of claim 9, further comprising receiving a retransmission of the PDSCH communication a preconfigured or prespecified number of times.

25. The method of claim 9, further comprising transmitting channel state information (CSI) using one or more uplink resources based at least in part on a determination that a CSI trigger condition is satisfied.

26. A network entity for wireless communication, comprising:

a memory; and one or more processors, coupled to the memory, configured to:

identify a group of user equipment (UEs) to receive multicast or broadcast traffic over a radio access network (RAN) based on the group of UEs sharing a common set of parameters indicated in the multicast or broadcast traffic, wherein a UE, of the group of UEs, is included in the group of UEs and a different group of UEs associated with a different common set of parameters, wherein the UE is part of multiple virtual local area networks (VLANs), wherein the common set of parameters includes a first VLAN of the multiple VLANs, and wherein the different common set of parameters include a second VLAN of the multiple VLANs;

transmit a configuration to the group of UEs, wherein the configuration includes a group identifier assigned to the group of UEs and the different group of UEs; and transmit the multicast or broadcast traffic over the RAN in a physical downlink shared channel (PDSCH) communication, wherein the group identifier is used to indicate the multicast or broadcast traffic to the group of UEs.

27. A user equipment (UE) for wireless communication, comprising:

a memory; and one or more processors, coupled to the memory, configured to:

receive a configuration for a group of UEs, including the UE, that is identified based on the group of UEs sharing a common set of parameters indicated in multicast or broadcast traffic, wherein the UE is included in the group of UEs and a different group of UEs associated with a different common set of parameters, wherein the UE is part of multiple virtual local area networks (VLANs), wherein the common set of parameters includes a first VLAN of the multiple VLANs, wherein the different common set of parameters include a second VLAN of the multiple VLANs, and wherein the configuration includes a group identifier assigned to the group of UEs and the different group of UEs; and receive the multicast or broadcast traffic over a radio access network (RAN) in a physical downlink shared channel (PDSCH) communication, wherein the group identifier is used to identify that the multicast or broadcast traffic is intended for the UE.

28. The UE of claim 27, wherein the configuration indicates one or more permitted transmission configuration indicator (TCI) states for the group of UEs.

29. The UE of claim 27, wherein a packet data convergence protocol (PDCP) header, that encapsulates the multicast or broadcast traffic, indicates a source UE, of the group of UEs, from which the multicast or broadcast traffic originated.

30. The UE of claim 27, wherein each UE, in the group of UEs, is associated with a same set of parameter values, used for packet filtering, included in the multicast or broadcast traffic.

* * * * *